United States Patent
Chow

(10) Patent No.: US 7,739,084 B2
(45) Date of Patent: Jun. 15, 2010

(54) SIMULATION TECHNIQUES

(75) Inventor: Peter Chow, Hayes Middlesex (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/292,852

(22) Filed: Nov. 26, 2008

(65) Prior Publication Data
US 2009/0138247 A1 May 28, 2009

(30) Foreign Application Priority Data
Nov. 27, 2007 (GB) ................. 0723224.2

(51) Int. Cl.
*G06F 17/10* (2006.01)
(52) U.S. Cl. ................. 703/2; 702/66; 702/13
(58) Field of Classification Search .............. 703/2, 703/9, 10; 702/66, 50, 13, 181; 716/10
See application file for complete search history.

(56) References Cited

U.S. PATENT DOCUMENTS

| | | | |
|---|---|---|---|
| 2003/0050760 A1* | 3/2003 | Namiki ................. | 702/66 |
| 2003/0060988 A1* | 3/2003 | Ginzburg ............... | 702/50 |
| 2005/0071123 A1* | 3/2005 | Kouritzin et al. ........ | 702/181 |
| 2006/0015306 A1* | 1/2006 | Chow ................... | 703/2 |
| 2006/0129366 A1* | 6/2006 | Shaw ................... | 703/10 |
| 2007/0043543 A1* | 2/2007 | Wandzura .............. | 703/2 |
| 2007/0204252 A1* | 8/2007 | Furnish et al. .......... | 716/10 |
| 2008/0077367 A1* | 3/2008 | Odajima ................ | 703/2 |
| 2008/0126047 A1* | 5/2008 | Lukis et al. ............. | 703/9 |
| 2008/0167849 A1* | 7/2008 | Hales et al. ............ | 703/10 |
| 2008/0288172 A1* | 11/2008 | Stone ................... | 702/13 |

FOREIGN PATENT DOCUMENTS

EP 1 617 309 1/2006

OTHER PUBLICATIONS

Deane T. Prescott, et al., "A Method for Incorporating Different Sized Cells into the Finite-Difference Time-Domain Analysis Technique", IEEE Microwave and Guided Wave Letters, vol. 2, No. 11, Nov. 1992, pp. 434-436.

(Continued)

*Primary Examiner*—Paul L Rodriguez
*Assistant Examiner*—Kandasamy Thangavelu

(57) ABSTRACT

A method for assessing wave propagation arising in a physical system by obtaining a numerical approximation of the physical system to be simulated, the method comprising
defining a computational domain comprising a first grid having at least two dimensions and a plurality of first-grid cells, and a second grid having at least two dimensions and a plurality of second-grid cells, wherein the second grid is a refinement of at least part of the first grid, and wherein each of the first-grid cells and second-grid cells has one or more solution points at which values representing a physical quantity of the physical system to be simulated may be obtained, wherein defining the computational domain comprises defining the second grid to have a first refinement factor compared to the first grid in one of the at least two dimensions and to have a second refinement factor compared to the first grid in another of the at least two dimensions, and defining the first refinement factor to be different from the second refinement factor; and
performing an update procedure to obtain a value for at least one solution point of every cell at a given stage in time.

10 Claims, 12 Drawing Sheets

OTHER PUBLICATIONS

L.A. Greda, et al., "Novel subgridding technique for the analysis of optical devices" Optical and Quantum Electronics, 2005, pp. 265-276.

Svetlana S. Zivanovic, et al., "A Subgridding Method for the Time-Domain Finite-Difference Method to Solve Maxwell's Equations", IEEE Transactions on Microwave Theory and Techniques, vol. 39, No. 3, Mar. 1991, pp. 471-479.

John W. Nehrbass, et al., "Optimal Finite-Difference Sub-Gridding Techniques Applied to the Helmholtz Equation" IEEE Transactions on Microwave Theory and Techniques, vol. 48, No. 6, Jun. 2000, pp. 976-984.

European Search Report issued on Jan. 23, 2009 in corresponding European Patent Application No. 08168756.8.

N. Venkataraylu et al. "A Stable FDTD Subgridding Method Based on Finite Element Formulation With Hanging Variables" IEEE Transactions on Antennas and Propagation, vol. 55, No. 3, Mar. 2007; p. 907.

K. Xiao et al. "A three-dimensional FDTD subgridding method with separate spatial and temporal subgridding interfaces" IEEE, 2005; pp. 578-583.

F. Collino et al. "A space-time mesh refinement for the 1D Maxwell's system" C.R. Acad. Sci. Paris, vol. 328, Series 1, 1999; pp. 263-268.

J. Rantakokko "Partitioning strategies for structured multiblock grids" Parallel Computing 26 (2000); pp. 1661-1680.

C.Vuik et al. "Coarse grid acceleration of a parallel block preconditioner" Future Generation Computer Systems 17 (2001); pp. 933-940.

Wikipedia "Computational electromagnetics" pp. 1-9.

Wikipedia "Electromagnetic wave equation" pp. 1-12.

Wikipedia "Maxwell's equations" pp. 1-20.

Wikipedia "Finite-difference time-domain method" pp. 1-7.

Search Report issued Mar. 17, 2008 in corresponding United Kingdom Patent Application No. 0723224.2.

Response filed in European Patent Office to European Search Report issued on Jan. 23, 2009 in corresponding European Patent Application No. 08168756.8.

* cited by examiner

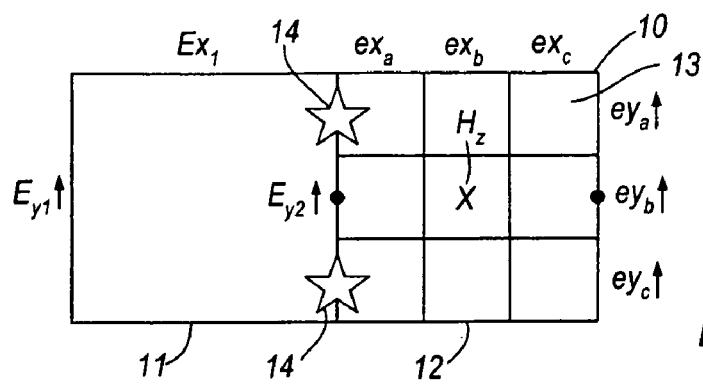
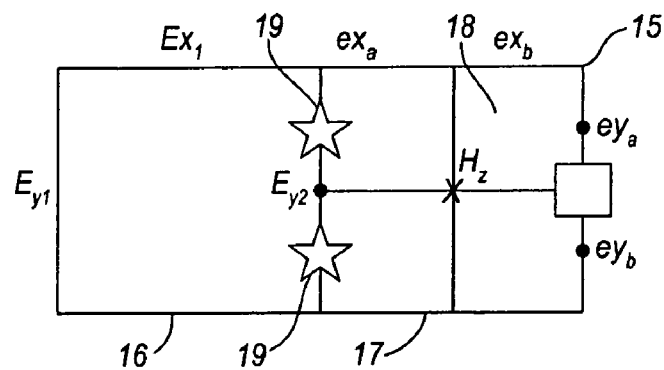
Fig. 6A
Fig. 6B

SIMULATION TECHNIQUES

The present invention relates to computer-implemented techniques for the numerical approximation of a system to be simulated and, particularly, to the analysis of electromagnetic fields using such techniques. The present invention finds particular, but not exclusive, application to the analysis of electromagnetic fields using the FDTD (Finite-Difference Time-Domain) technique to solve the Maxwell Equations and thus to simulate and forecast the dynamics of electromagnetic wave propagation for a given environment and conditions.

BACKGROUND

There is an ever increasing need to simulate and consider the effect of a wide variety of wave phenomena, such as electromagnetic wave propagation, arising in a variety of environments. Being able to simulate, for example, the dynamics of fluid propagation, heat transfer or electromagnetic radiation is highly advantageous in a number of industries. In particular, electromagnetic field simulation plays an important role in the design and development of electronic products. In this rapidly-changing technology, the time taken in bringing a product to the market place can be critical in maintaining a commercial advantage. In this regard, electromagnetic simulation can provide a highly advantageous tool for design engineers in advancing the development of a device. It may be used, for example, to approximate the surface currents and interior fields arising in complex electronic objects. Electromagnetic simulation is also employed to analyse the electromagnetic radiation emitted by electronic devices, particularly mobile communication devices, in order to assess the health and safety issues for these devices. Furthermore, the study of electromagnetic scattering plays a central role in the design of many complex structures, such as aircrafts, in order to optimise the design and shape of a structure surface. The simulation of convective heat transfer is a useful aid in the analysis and development of ventilation (cooling and/or heating) systems such as those employed in electronic devices. It also provides a tool suitable for use in fire simulation methods which seek to consider the potential fire hazards arising in the electronics industry and other industries.

Generally speaking, the main steps involved in any modelling process are:
1) To define the geometry of a system (i.e. structure or environment) under consideration on a structured grid, taking into account the need to impose boundary conditions on the finite grid as well as the material properties (e.g., for electromagnetic modelling, the magnetic permittivity $\epsilon$, the magnetic permeability $\mu$, and the electric conductivity ca should be defined);
2) To calculate the numerical solutions for the physical phenomenon under consideration at each node within the grid at a given instant in time; and
3) To provide means for visualising and potentially manipulating the solutions obtained at each time step of the calculation.

One scheme which finds use in such modelling methods is the FDTD scheme. It was first proposed by Yee in 1966 and is used in a number of computational simulation tools for analysing the behaviour of electromagnetic propagation within a one-, two-, or three-dimensional domain. Broadly speaking, the scheme employs a finite difference and finite time domain approach to discretise the differential form of Maxwell's equations. By this method, derivatives of the electric and magnetic field variables required by Maxwell's equations are approximated by spatial finite differences and the calculation then proceeds in a series of time steps.

In accordance with the FDTD technique, the computational domain or "space" in which the simulation will be performed is represented by a Cartesian grid, discrete in both time and space, comprising a plurality of cells in one, two or three dimensions. FIG. 3 shows a three-dimensional cell, each point of the cell being represented by a set of integers (i, j, k), where i, j and k are grid coordinate numbers in the x-axis, y-axis and z-axis directions respectively. Each of the cells comprises a number of solution points or nodes for the electric and magnetic fields at a given instant in time. In this illustration, the electric field components are defined on the cell faces and the magnetic field components are defined on the cell edges. In accordance with the FDTD principle, the electric field is staggered both spatially and temporally from the magnetic field.

As with any explicit numerical modelling technique, which employs a grid structure for the computational domain, there exists a restriction on the time step $\Delta t$ with respect to the cell size to ensure stability. Within the FDTD scheme this is given by:

$$\Delta t \leq \left\langle v \sqrt{\frac{1}{\langle \Delta x \rangle^2} + \frac{1}{\langle \Delta y \rangle^2} + \frac{1}{\langle \Delta z \rangle^2}} \right\rangle^{-1}$$

where v is the speed of light in free space.

This stability condition, known as the Courant-Friedrichs-Lewy (CFL) condition, imposes a restriction on the size of the time step $\Delta t$ in relation to the cell dimensions of the grid.

In many instances, the object or environment to be modelled exhibits so-called inhomogeneities, such as complex or small-scale geometry, or curved boundaries. In order to accurately simulate and consider the effect of these inhomogeneities, the computational domain should preferably allow the numerical solution procedure to capture different levels of detail throughout the system. Analysing electromagnetic fields using a grid which cannot adequately resolve intricate or small-scale structures leads to an inaccurate simulation which, in many applications, can have critical consequences. Obtaining a model of insufficient accuracy is particularly unacceptable in applications where human safety is being investigated, for example analysing the effect of electromagnetic radiation from mobile communication devices on the human body. Furthermore, in complex multi-dimensional situations, for example when trying to simulate and forecast the electromagnetic dynamics for a complex object, such as a laptop computer, it is necessary to be able to resolve and precisely represent the electromagnetic interactions arising within the laptop at component level.

Thus, it is apparent that the grid dimensions ($\Delta x$, $\Delta y$, $\Delta z$) employed in any gridded domain for simulation must be small enough to accurately represent the smallest feature in the model. Naturally, fine geometric features require fine grid cells for precise representation and thus, where a grid is employed throughout the domain in which $\Delta x = \Delta y = \Delta z$ for three dimensions, any spatial refinement needed to resolve small details leads to a global refinement of the computational grid dimensions. Similarly, the simulation of any wave phenomenon varying at a high frequency requires fine grid cells to represent accurately the propagation of the wave with time. If the object under consideration, or a part of it, is a small-scale or complex geometrical structure, such as a wire, it is clear that a fine grid is required accurately to model the field arising in the vicinity of the wire when an electric current is passed through the wire. Similarly, the errors that arise when modelling curved surfaces, due to the way in which they are 'staircased' to fit into the Cartesian grid, can be alleviated by employing a higher level of grid refinement.

Thus, to attain accuracy, fine grid cells are essential. An obvious consequence of the need to use fine grid cells in a uniform computational grid is an increase in the number of cells, and thus solution points, in the model. This in turn leads to a higher computing cost in terms of both memory and calculation time. In the example of FDTD schemes, the problem is further compounded by the CFL stability condition which bounds the time step $\Delta t$ in relation to the grid size so that the finer the grid cell, the smaller the time step $\Delta t$, thus further increasing the calculation workload. Software tools developed to analyse three-dimensional, highly intricate, high-frequency models therefore require substantial computing resources in the form of a large memory and high-processing-power central processing units to conduct a simulation that takes a considerable time to run.

Parallel processing, in which the grid is partitioned amongst the processing elements available for a collective computation to attain the solution, offers one means by which the calculation time of a numerical approximation can be reduced. However, this approach is often not cost effective, particularly in complex situations, since any advantage gained in the reduction of the calculation time may be countered by the considerable cost of adding the extra processing elements.

Rather than dividing the entire computational domain into a grid of fine cells, it is known to employ a coarse grid globally over the domain and then to apply one or more fine grids, each fine grid having a plurality of fine-grid cells in regions where they are needed. A domain comprising a coarse grid and having an embedded fine grid is shown in FIGS. 1A and 1B. FIG. 1A shows a two-dimensional coarse grid 20 which is uniformly refined by a fine grid 21 having nine cells for each cell of the coarse grid 20. FIG. 1B shows a three-dimensional coarse grid 22 which is uniformly refined by a fine grid 23 having sixteen cells for each cell of the coarse grid 22. This technique, known as subgridding, can therefore reduce the computational resource requirement by intelligently embedding fine grids locally in regions where they are needed within a coarse-grid model in order to resolve small-scale structures or to improve the modelling of curved boundaries. The savings in both memory and calculation time can be substantial, yet the technique substantially upholds the solution accuracy to that attained by a fine-grid model.

Despite the significant computational advantages that can be achieved by this technique, which circumvents the need to use a very small time step throughout the whole computational domain, subgridding methods are not commonly applied, at least in FDTD, primarily due to numerical instabilities arising at an interface between the coarse and fine grids. The numerical instability arises as a consequence of the discontinuity in the number of solution points at the interface between the coarse grid and the fine grid. In particular, errors are introduced by the temporal and spatial interpolation required to convey information at the interface between the two grids. Non-uniform grids (i.e. individual grids in which the size and shape of cells varies), which are often used in a single grid system, typically suffer from higher errors than uniform grids. Consequently, any previously-used multigrid schemes have employed only grids having uniform, regularly-shaped cells in each grid of the scheme.

SUMMARY

According to a first aspect, there is provided a method for assessing wave propagation arising in a physical system by obtaining a numerical approximation of the physical system to be simulated, the method comprising defining a computational domain comprising a first grid having at least two dimensions and a plurality of first-grid cells, and a second grid having at least two dimensions and a plurality of second-grid cells, wherein the second grid is a refinement of at least part of the first grid, and wherein each of the first-grid cells and second-grid cells has one or more solution points at which values representing a physical quantity of the physical system to be simulated may be obtained, wherein defining the computational domain comprises defining the second grid to have a first refinement factor compared to the first grid in one of the at least two dimensions and to have a second refinement factor compared to the first grid in another of the at least two dimensions, and defining the first refinement factor to be different from the second refinement factor; and performing an update procedure to obtain a value for at least one solution point of every cell at a given stage in time.

Surprisingly, the inventor has found that, despite the prejudices against multigrid schemes, it is possible to provide a stable multigrid scheme which can reduce computational load.

According to preferred invention embodiments, by refining the first grid to different extents in different dimensions, it is possible to reduce the computational load by varying the number of solution points at which values of the physical quantity must be obtained, according to the field characteristics in each dimension, so as to avoid unnecessarily calculating extra solution points. The inventor has been able to achieve this whilst refining a stable scheme.

By "refinement factor" is meant the whole number by which a cell has been divided in one of the x, y, and z directions. Alternatively, it may be defined as the ratio between the size of a coarser cell in one of the x, y and z directions and the size (in the same direction) of a finer cell which is a refinement of the coarser cell. (It is to be understood from the use of the terms "coarser" and "finer" that the terms may apply to grids other than the coarse grid, i.e. they may apply to a primary-level fine grid and a secondary-level fine grid.) Thus, when a three-dimensional cell is refined, there may be three different refinement factors, one for each of the x, y and z directions. These refinement factors may be labelled $k_x$, $k_y$ and $k_z$, for example. Thus, if a coarser cell has finer cells of refinement factor $[k_x \, k_y \, k_z]=[1 \, 2 \, 3]$ embedded within it, there will be one finer cell per coarser cell in the x direction, two finer cells per coarser cell in the y direction and three finer cells per coarser cell in the z direction.

It should be appreciated that domains having several levels of refinement are envisaged in which a fine grid having a higher level of refinement may be embedded within a fine grid having a lower level of refinement. For example, a primary-level fine grid may have at least one secondary-level fine grid embedded within one or more of the primary-level fine-grid cells. Thus, in situations where significant refinement of the coarse grid is needed in order to resolve a particular feature or source of inhomogeneity, the required level of refinement can be achieved in a series of refinement stages. In this way, the discontinuity between the coarse grid and the ultimate grid of the required refinement level is more gradually introduced bringing a greater level of stability to the calculation procedure.

It may be the case that the first grid is not refined by the second grid in one of the dimensions. In this case, defining the computational domain may comprise defining one of the first and second refinement factors to be equal to one. This situation is shown in FIG. 8, for example, in which there is no refinement in the y direction, only refinement in the x direction.

It may be the case that it is necessary for the computational domain to have a third dimension. In this case, defining the computational domain may comprise defining each of the first and second grids to have a third dimension;

defining the second grid to have a third refinement factor compared to the first grid in the third dimension; and defining the third refinement factor to be different to at least one of the first and second refinement factors. Defining the computational domain may comprise defining the third refinement factor to be different to both of the first and second refinement factors. Thus, the possibility is introduced that a refinement factor in the third dimension may be different to one or both of the refinement factors in the first and second dimensions, allowing for further flexibility and/or reduced computational load.

It may be the case that a third grid is useful in the computational domain. In this case, defining the computational domain may comprise defining a third grid having at least two dimensions and a plurality of third-grid cells, wherein the third grid is a refinement of at least part of the second grid;

defining the third grid to have a first refinement factor compared to the second grid in one of the at least two dimensions;

defining the third grid to have a second refinement factor compared to the second grid in another of the at least two dimensions; and defining the first refinement factor of the third grid to be different to the second refinement factor of the third grid. Thus, the possibility is introduced that the third grid may be a non-uniform refinement of the second grid, which is itself a non-uniform refinement of the first grid.

According to a second aspect, there is provided an apparatus for assessing wave propagation arising in a physical system by obtaining a numerical approximation of the physical system to be simulated, the apparatus comprising domain circuitry configured to define a computational domain comprising a first grid having at least two dimensions and a plurality of first-grid cells, and a second grid having at least two dimensions and a plurality of second-grid cells, wherein the second grid is a refinement of at least part of the first grid, and wherein each of the first-grid cells and second-grid cells has one or more solution points at which values representing a physical quantity of the physical system to be simulated may be obtained, wherein the domain circuitry is configured to define the second grid to have a first refinement factor compared to the first grid in one of the at least two dimensions and to have a second refinement factor compared to the first grid in another of the at least two dimensions, and to define the first refinement factor to be different from the second refinement factor; and update circuitry configured to perform an update procedure to obtain a value for at least one solution point of every cell at a given stage in time.

The domain circuitry may be configured to define one of the first and second refinement factors to be equal to one.

The domain circuitry may be configured to define one of the first and second refinement factors to be equal to two or more.

The domain circuitry may be configured to define each of the first and second grids to have a third dimension;

to define the second grid to have a third refinement factor compared to the first grid in the third dimension; and to define the third refinement factor to be different to at least one of the first and second refinement factors.

The domain circuitry may be configured to define the third refinement factor to be different to both of the first and second refinement factors.

The domain circuitry may be configured to define a third grid having at least two dimensions and a plurality of third-grid cells, wherein the third grid is a refinement of at least part of the second grid;

to define the third grid to have a first refinement factor compared to the second grid in one of the at least two dimensions;

to define the third grid to have a second refinement factor compared to the second grid in another of the at least two dimensions; and to define the first refinement factor of the third grid to be different to the second refinement factor of the third grid.

According to a third aspect, there is provided a computer program which, when run on a computer, causes the computer to perform the method of the first aspect.

According to a fourth aspect, there is provided a computer program which, when loaded into a computer, causes the computer to become the apparatus of the second aspect.

The computer program of the third or fourth aspect may be carried by a carrier medium.

The carrier medium may be a recording medium.

The carrier medium may be a transmission medium.

According to a fifth aspect, there is provided a computer program for assessing wave propagation arising in a physical system by obtaining a numerical approximation of the physical system to be simulated, which, when run on a computer, causes the computer to perform a method comprising defining a computational domain comprising a first grid having at least two dimensions and a plurality of first-grid cells, and a second grid having at least two dimensions and a plurality of second-grid cells, wherein the second grid is a refinement of at least part of the first grid, and wherein each of the first-grid cells and second-grid cells has one or more solution points at which values representing a physical quantity of the physical system to be simulated may be obtained, wherein defining the computational domain comprises defining the second grid to have a first refinement factor compared to the first grid in one of the at least two dimensions and to have a second refinement factor compared to the first grid in another of the at least two dimensions, and defining the first refinement factor to be different from the second refinement factor; and performing an update procedure to obtain a value for at least one solution point of every cell at a given stage in time.

Solutions for second-grid cells on the perimeter of the second grid may be obtained from the co-located first-grid value by means of spatial and temporal interpolation. Similarly, solutions for third-grid cells on the perimeter of the third grid may be obtained from the co-located second-grid value by means of spatial and temporal interpolation.

The computational domain may be created by means of a computer program run on a computer. Input data representing the system geometry and material properties may be entered by a user. Furthermore, the update procedure may be carried out by means of a computer program installed and run on a computer.

The above aspects may be employed for the numerical approximation of an electromagnetic field based on a FDTD (Finite-Difference Time-Domain) method. In this method, each cell holds an arrangement of solution points for the electromagnetic field in which the solution points for the electric field ($\vec{E}$) are staggered orthogonally with respect to the solution points of the magnetic field ($\vec{H}$). The update procedure may be performed to obtain solutions for the electric and magnetic fields using the FDTD updating equations which define a new value of a first-field component (where the first-field component is one of E or H) at a given instant in time and point in space in relation to a gradient term of a second-field component (where the second field component is the other of E and H) at the given point in space of the first-field component. The gradient term can be approximated by the difference between the value of the second-field component on one side of the given point in space of the first-field component and the value of the second-field component on an opposite side of the given point in space of the first-field component.

During the update procedures performed in order to update the solution for a field at a given instant in time, the whole of the coarsest grid may be updated even in regions where one or more finer grids exist. This is due to the explicit nature of the FDTD scheme which depends upon values being obtainable at all points in a rectangular grid of a particular refinement level in order to fully complete the update for that grid and thus to approximate electromagnetic propagation through the whole domain. If, for example, solutions for the coarsest grid were discontinued in regions where a fine grid existed, there would effectively be a "hole" in the coarsest grid. It may not then be possible to update the coarsest grid at solution points in the vicinity of the finer grid since required values of the coarsest grid in that vicinity would be missing.

The computational domain may comprise a Cartesian-type grid.

During the update procedure, solutions may be determined at the perimeter of the second grid by means of spatial and temporal interpolation.

The second grid and/or the third grid may be positioned within the computational domain so as to map inhomogeneities arising in the physical system to be stimulated.

Any one or more of the first, second and third grids may be non-regular in shape.

The computational domain may be created by means of a computer program run on a computer.

The update procedure may be performed by means of a computer program run on a computer.

According to a sixth aspect, there is provided a method for assessing wave propagation arising in a physical system by obtaining a numerical approximation of the physical system to be simulated, the method comprising non-uniform refinement of at least part of at least one grid of a multi-grid computational domain.

According to a seventh aspect, there is provided an apparatus for assessing wave propagation arising in a physical system by obtaining a numerical approximation of the physical system to be simulated, the apparatus comprising domain circuitry configured for non-uniform refinement of at least part of at least one grid of a multi-grid computational domain.

The method or apparatus of the sixth or seventh aspect may include features of any one or more of the previous aspects.

Embodiments of the present invention may find particular use in numerical approximation methods which employ a domain comprising a structured Cartesian grid.

The invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

For a better understanding of the present invention, and to show how the same may be carried into effect, reference will now be made, by way of example, to the accompanying drawings in which:

FIG. 6 illustrates solution points arising at and adjacent to a co-located edge;

DETAILED DESCRIPTION

The following background theory relating to the FDTD scheme for simulating electromagnetic radiation is considered useful to aid the understanding of the present invention.

Figure 1A:
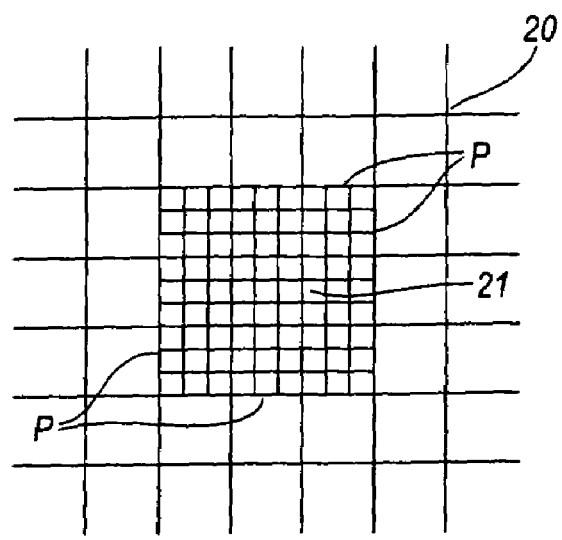
FIGS. 1A and 1B show the application of an embedded fine grid to a computational domain illustrated in two and three dimensions respectively.
Figure 1B:
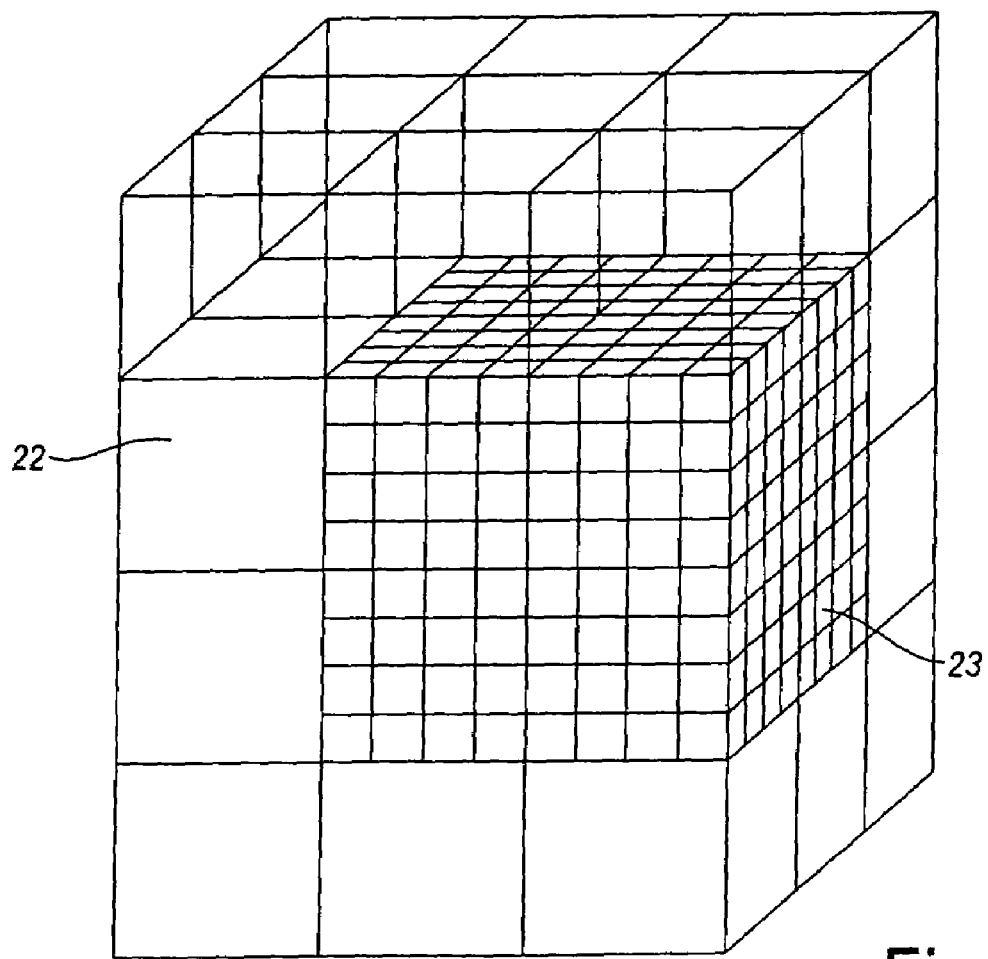

FIG. 1A shows, in two dimensions, part of a computational domain comprising a coarse grid 20 and a fine grid 21 embedded therein. The perimeter P of the fine grid, which is embedded within an area of nine coarse-grid cells, forms the interface between the coarse grid and the fine grid. FIG. 1B shows, in three dimensions, part of a computational domain comprising a coarse grid 22 and a fine grid 23 embedded therein.

Figure 2A:
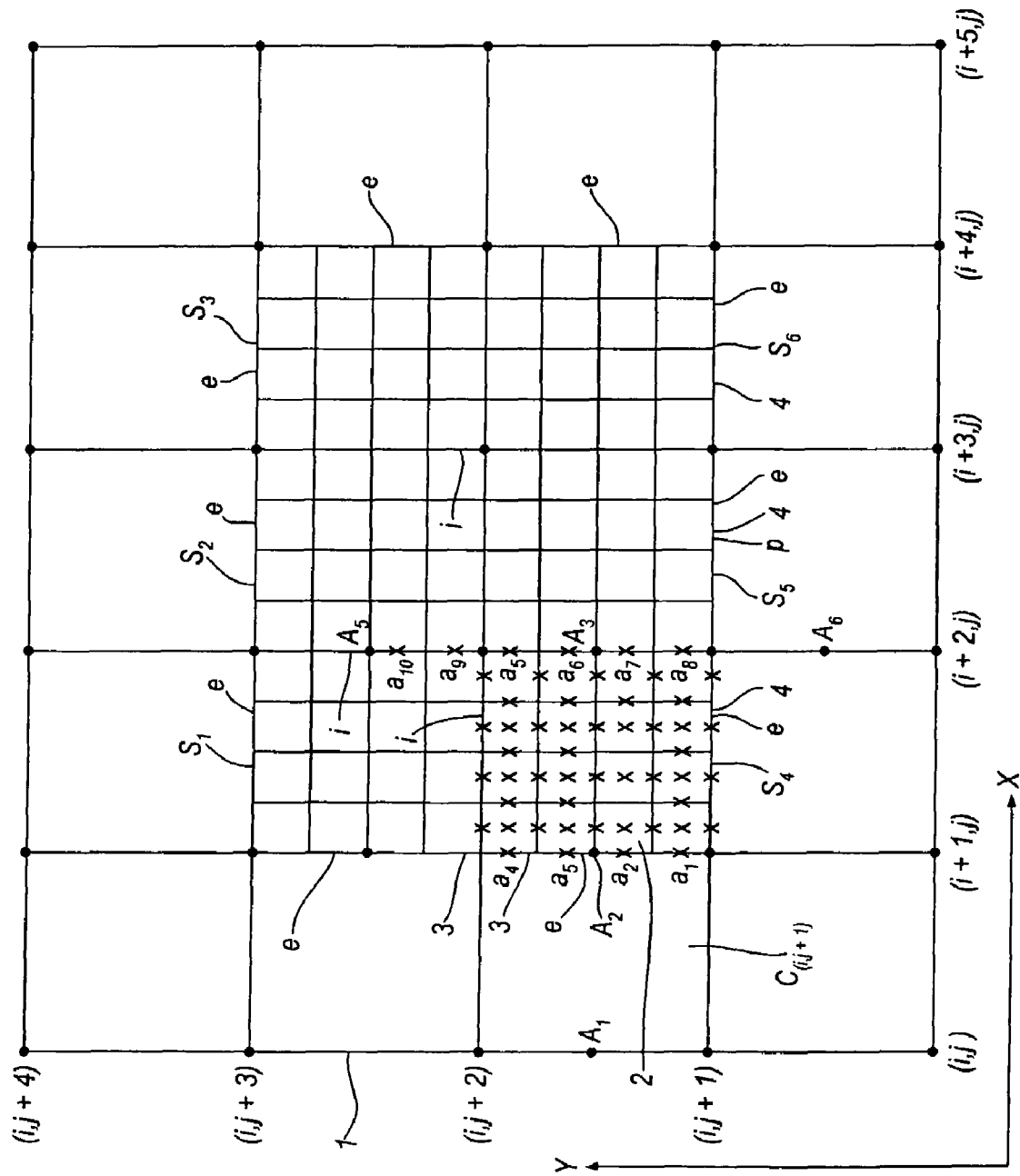
FIG. 2A shows a two-dimensional Cartesian-grid domain and FIG. 2B shows, to a larger scale, part of the domain of FIG. 2A.

FIG. 2A shows a two-dimensional domain comprising a coarse grid 1 having a fine grid 2 of refinement factor $[k_x \ k_y]=[4\ 4]$, the fine grid being a refinement of six neighbouring coarse-grid cells $S_1$ to $S_6$. P defines the perimeter of the fine grid and is comprised of the external interfaces e between the coarse grid and fine grid. A common interface i exists at each point within the fine grid 2 where the edges of fine-grid cells coincide with the edges of coarse-grid cells. Each grid point may be represented by a pair of integers (i, j), where i and j are grid coordinate numbers in the x and y directions respectively. Each of the cells comprises a number of solution points for the numerical approximation which are solved at a given instant in time. Thus, the picture simulated from the mathematical solutions on the grid is representative of the physical system being simulated at a given instant in time n. In this illustration, solution points are provided at each of the cell edges and cell faces, as depicted for the fine grid within coarse-grid cell $S_4$.

In order to update the values at each of the solution points, an explicit time-marching solution procedure is carried out in which solutions are obtained at a given instant in time with reference to values at the previous instant in time. Solutions are firstly obtained in this way for the coarse grid. During the update procedure, and in order to update the solution points of the each of fine-grids, the fine-grid values at each common interface within the fine grid 2 are obtained from the coarse-grid solution at that common interface by means of spatial and temporal interpolation. Thus, in order to obtain values $a_5$, $a_6$, $a_9$ and $a_{10}$, interpolation is conducted using $A_3$ and $A_5$. Standard linear interpolation functions may be used for both the temporal and spatial interpolation. In particular, the temporal interpolation function may be given by: $T(A^n, A^{n+1}, j) = A^n + j(A^{n+1} - A^n)$ where j is the missing fine-grid temporal value. For example, in FIG. 2A, missing temporal value $n+\frac{1}{4}$ at location $A_3$ is given by: $a^{n+1/4} = T(A_3^n, A_3^{n+1}, \frac{1}{4})$. Furthermore, the spatial interpolation function may be given by: $S(A_i, A_j, d) = A_i + d(A_j - A_i)$ where i and j are the coordinates for the coarse-grid location of value A and d is the normalised distance away from i along the i to j path. For example, in FIG. 2A, the missing spatial value for $a_5$ is $a_5 = S(A_3, A_5, d_5)$.

The solution points of the fine-grid cells are thus updated from the coarse-grid interface appropriate for the direction of update following interpolation methods which fill in the missing fine-grid values.

Figure 2B:
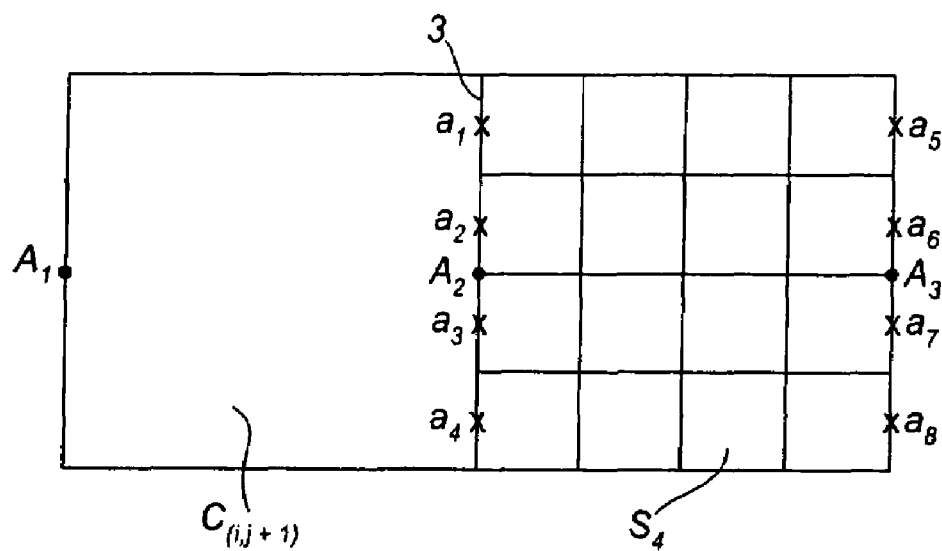

FIG. 2B shows an enlarged version of the coarse-grid cells $C_{(i,j+1)}$ and $S_4$ of FIG. 2A in order to illustrate the interpolation procedure required to obtain values at the initial boundary of the fine grid. Coarse-grid cell $S_4$ and not coarse-grid cell $C_{(i,j+1)}$ is refined by the fine grid 2. Solutions are obtained for the coarse-grid solution points $A_1$ and $A_2$ using appropriate numerical updating stencils for the simulation. In order to commence the update for the fine-grid solution points, spatial values are required at solution points $a_1$ to $a_4$, which may be obtained using spatial and temporal interpolation between the co-located coarse-grid point $A_2$ and at least one other coarse-grid value. The linear interpolation functions described above may be used to obtain the fine-grid solutions at solution points $a_1$ to $a_4$. Thus, missing temporal value $n+\frac{1}{4}$ at location $A_2$ is given by: $a^{n+1/4} = T(A_2^n, A_2^{n+1}, \frac{1}{4})$. Furthermore, the spatial interpolation function may be given by: $S(A_i, A_j, d) = A_i + d(A_j - A_i)$ where i and j are the coordinates for the coarse-grid location of value A and d is the normalised distance away from i along the i to j path.

Figure 3:
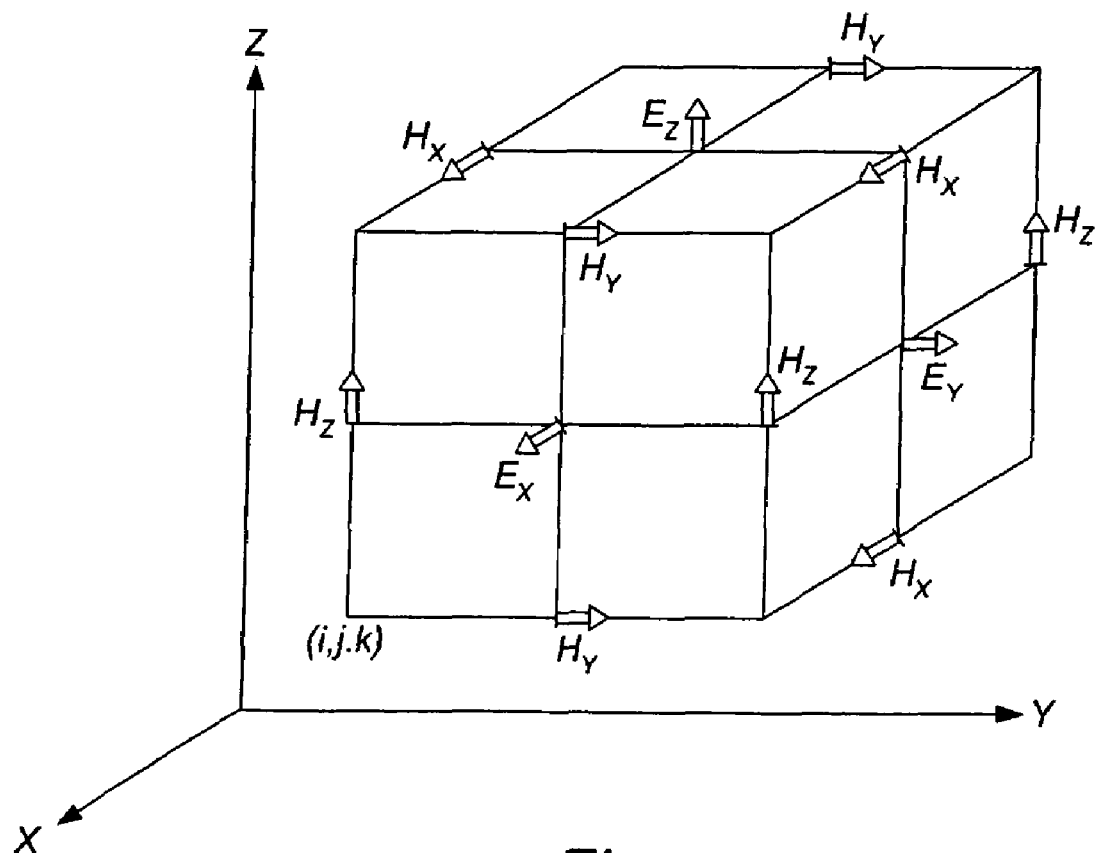
FIG. 3 shows a three-dimensional cell employed in a FDTD (Finite-Difference Time-Domain) scheme.
Figure 4:
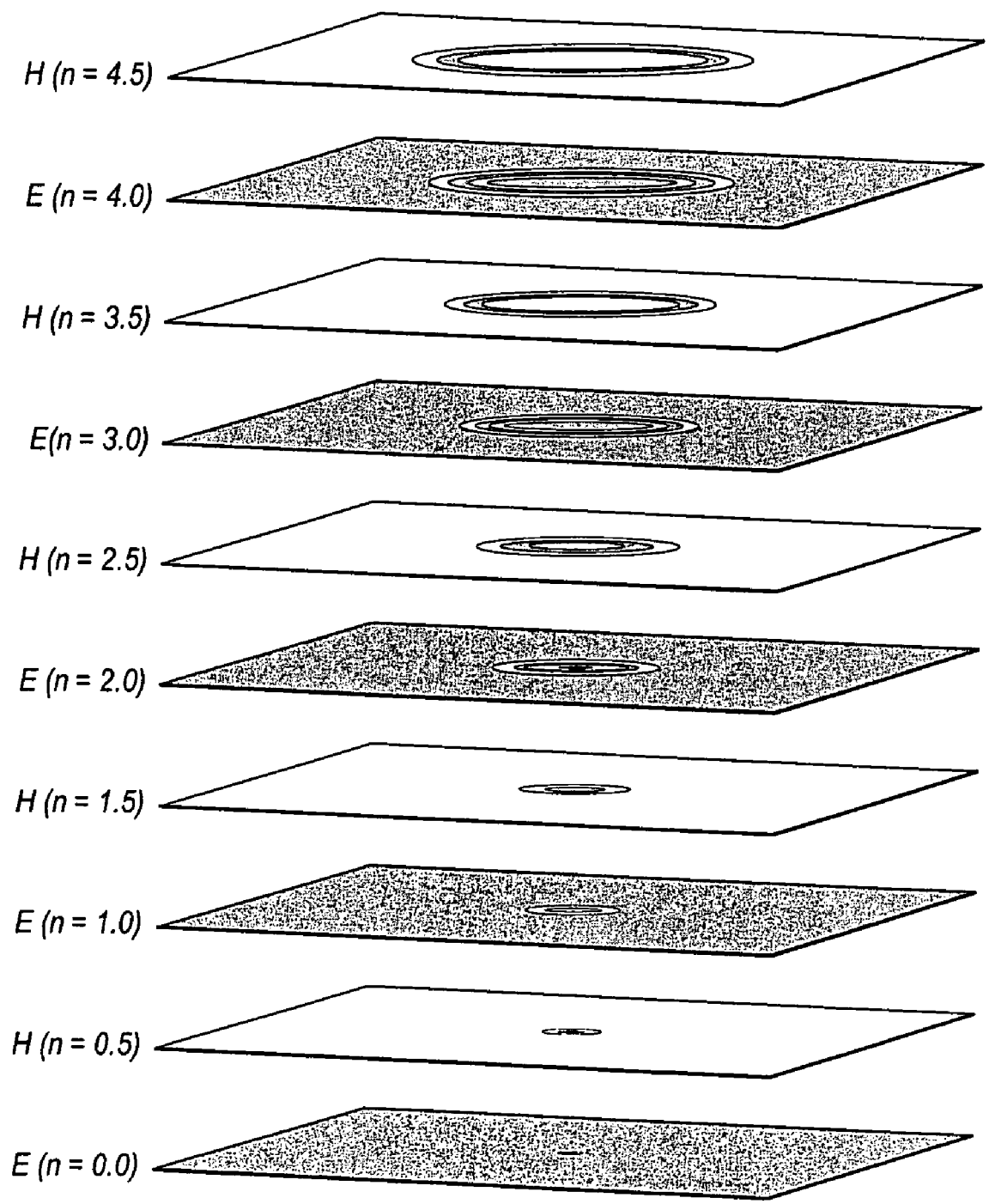
FIG. 4 illustrates a simulated electromagnetic wave propagating from a central source point.

FIG. 3 shows a three-dimensional cell wherein each point of the cell is represented by integers (i, j, k), where i, j and k are grid coordinate numbers in the x, y and z directions respectively. The cell comprises a number of solution points or nodes for the electric and magnetic fields at a given instant in time. In this illustration, the electric field components are defined on the cell faces and the magnetic field components are defined on the cell edges. In accordance with the FDTD principle, the electric field solution points are staggered both spatially and temporally from the magnetic field solution points. This means that no solution is obtained for both the electric and magnetic field at the same instant in time or at the same position in space. Rather, the electric field is solved at a given instant in time, say n=0, 1, 2 ... and the magnetic field is solved at the next instant in time, say n=0.5, 1.5, 2.5 .... This is illustrated pictorially in FIG. 4 which shows a simple electromagnetic wave propagating from a central source point where the initial field conditions are zero at all points in space.

Any electromagnetic field is fully described by the Maxwell equations:

$$\nabla \cdot \vec{E} = 0 \quad (1)$$

$$\nabla \cdot \vec{H} = 0 \quad (2)$$

$$\mu \frac{\partial \vec{H}}{\partial t} = \nabla \times \vec{E} \quad (3)$$

$$\varepsilon \frac{\partial \vec{E}}{\partial t} + \sigma \vec{E} = \nabla \times \vec{H} \quad (4)$$

where E=(Ex, Ey, Ez) is the electric field (V/m), H=(Hx, Hy, Hz) is the magnetic field (A/m), $\epsilon$ is the magnetic permittivity (F/m), $\mu$ is the magnetic permeability (H/m) and $\sigma$ is the electric conductivity (S/m).

Writing equations (3) and (4) in component form gives:

$$\mu \frac{\partial H_x}{\partial t} = \frac{\partial E_y}{\partial z} - \frac{\partial E_z}{\partial y} \quad (5)$$

$$\mu \frac{\partial H_y}{\partial t} = \frac{\partial E_z}{\partial x} - \frac{\partial E_x}{\partial z} \quad (6)$$

$$\mu \frac{\partial H_z}{\partial t} = \frac{\partial E_x}{\partial y} - \frac{\partial E_y}{\partial x} \quad (7)$$

$$\varepsilon \frac{\partial E_x}{\partial t} + \sigma E_x = \frac{\partial H_z}{\partial y} - \frac{\partial H_y}{\partial z} \quad (8)$$

$$\varepsilon \frac{\partial E_y}{\partial t} + \sigma E_y = \frac{\partial H_x}{\partial z} - \frac{\partial H_z}{\partial x} \quad (9)$$

$$\varepsilon \frac{\partial E_z}{\partial t} + \sigma E_z = \frac{\partial H_y}{\partial x} - \frac{\partial H_x}{\partial y} \quad (10)$$

It can be seen from equation (3) that the time derivative of the H field is dependent on the Curl of the E field (i.e. the change in the E field across space). Similarly from equation (4), the time derivative of the E field is dependent on the change in the H field across space. This leads us to the basic FDTD expression that the new value of the E-field $E^{N+1}$ at a given point in space is dependent on i) the old value of the E-field $E^N$ at the same point in space and ii) the difference between the old value of the H-field, $H^{N+1/2}$, on one side of the E-field point in space and the value of $H^{N+1/2}$ on another side of the E-field point in space. Similarly, the new value of the H-field is dependent on the old value of the H-field and the difference between the old values for the E-field on either side of the H-field point. Thus, approximating the spatial derivatives of equations (5) to (10) gives the following FDTD central-difference updating stencils for the electromagnetic field:

$$H_x^{n+1/2}(i, j+1/2, k+1/2) = \qquad(11)$$
$$H_x^{n-1/2}(i, j+1/2, k+1/2) + D_b(i, j+1/2,$$
$$k+1/2)[\{E_y^n(i, j+1/2, k+1) - E_y^n(i, j+1/2, k)\}/\Delta z(k) -$$
$$\{E_z^n(i, j+1, k+1/2) - E_z^n(i, j, k+1/2)\}/\Delta y(j)]$$

$$H_y^{n+1/2}(i, +1/2, j, k+1/2) = \qquad(12)$$
$$H_y^{n-1/2}(i+1/2, j, k+1/2) + D_b(i+1/2, j,$$
$$k+1/2)[\{E_z^n(i+1, j, k+1/2) - E_z^n(i, j, k+1/2)\}/\Delta x(i) -$$
$$\{E_x^n(i+1/2, j, k+1) - E_x^n(i+1/2, j, k)\}/\Delta z(k)]$$

$$H_z^{n+1/2}(i+1/2, j+1/2, k) = \qquad(13)$$
$$H_z^{n-1/2}(i+1/2, j+1/2, k) + D_b(i+1/2, j+1/2,$$
$$k)[\{E_x^n(i+1/2, j+1, k) - E_x^n(i+1/2, j, k)\}/\Delta y(j) -$$
$$\{E_y^n(i+1, j+1/2, k) - E_y^n(i, j+1/2, k)\}/\Delta x(i)]$$

$$E_x^{n+1}(i+1/2, j, k) = \qquad(14)$$
$$C_a(i+1/2, j, k) \cdot E_x^n(i+1/2, j, k) + C_b(i+1/2, j,$$
$$k)[\{H_z^{n+1/2}(i+1/2, j+1/2, k) - H_z^{n+1/2}(i+1/2, j-1/2, k)\}/$$
$$\Delta y(j) - \{H_y^{n+1/2}(i+1/2, j, k+1/2) -$$
$$H_y^{n+1/2}(i+1/2, j, k-1/2)\}/\Delta z(k)]$$

$$E_y^{n+1}(i, j+1/2, k) = \qquad(15)$$
$$C_a(i, j+1/2, k) \cdot E_y^n(i, j+1/2, k) + C_b(i, j+1/2,$$
$$k)[\{H_x^{n+1/2}(i, j+1/2, k+1/2) - H_x^{n+1/2}(i, j+1/2, k-1/2)\}/$$
$$\Delta z(k) - \{H_z^{n+1/2}(i+1/2, j+1/2, k) -$$
$$H_z^{n+1/2}(i-1/2, j+1/2, k)\}/\Delta x(i)]$$

$$E_z^{n+1}(i, j, k+1/2) = C_a(i, j, k+1/2) \cdot E_z^n(i, j, k+1/2) + \qquad(16)$$
$$C_b(i, j, k+1/2)[\{H_y^{n+1/2}(i+1/2, j, k+1/2) -$$
$$H_y^{n+1/2}(i-1/2, j, k+1/2)\}/\Delta x(i) -$$
$$\{H_x^{n+1/2}(i, j+1/2, k+1/2) - H_x^{n+1/2}(i, j-1/2, k+1/2)\}/$$
$$\Delta y(j)]$$

$$\text{where } D_b(i, j, k) = \frac{\Delta t}{\mu(i, j, k)}$$

$$C_a(i, j, k) = \frac{2\varepsilon(i, j, k) - \sigma(i, j, k)\Delta t}{2\varepsilon(i, j, k) + \sigma(i, j, k)\Delta t}$$

$$C_b(i, j, k) = \frac{2\Delta t}{2\varepsilon(i, j, k) + \sigma(i, j, k)\Delta t}$$

During the computational simulation, equations (11) to (16) are solved in a leap-frog manner to incrementally advance the E and H fields forward in time by a time step $\Delta t$.

Figure 5A:
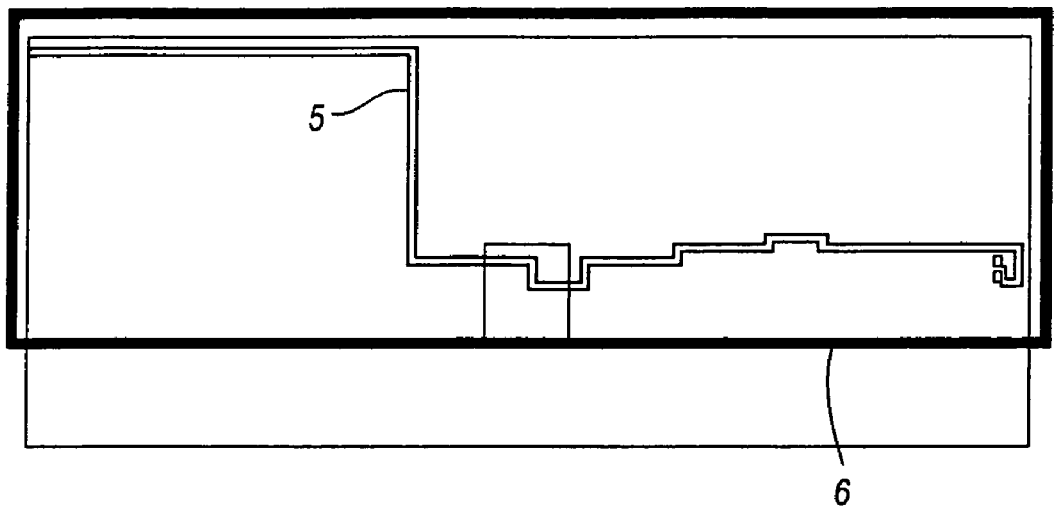
FIG. 5A shows an application of a fine gird to a signal line structure and FIG. 5B shows the application of a fine-grid region comprising a number of fine grids to the signal line structure.
Figure 5B:
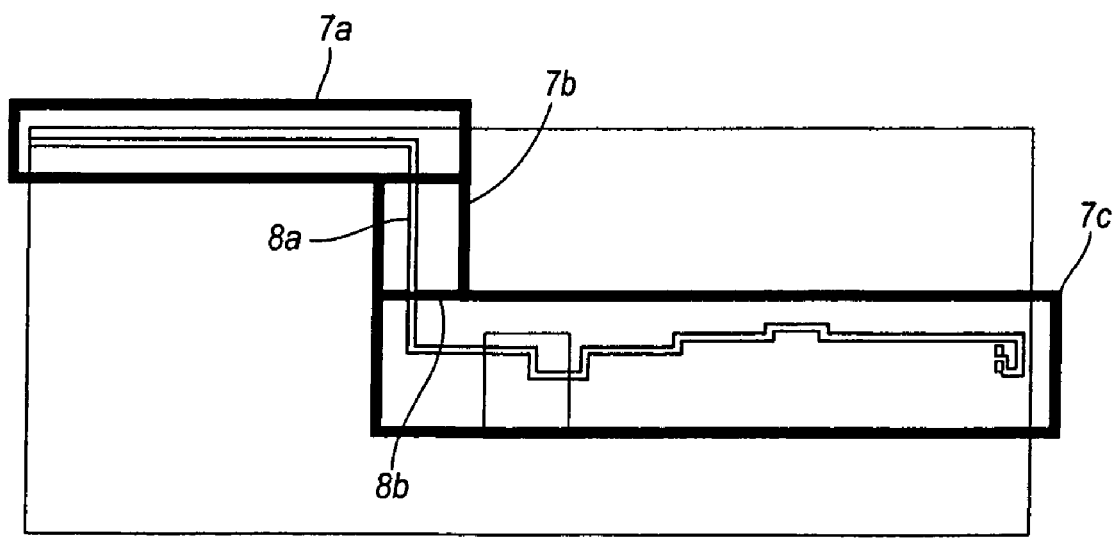

FIG. 5 shows a signal line structure 5 for which a model of the electromagnetic radiation arising in the vicinity of the signal line is required. FIG. 5A shows a large fine grid 6 applied to the domain required to obtain the numerical approximation of the signal line structure. It can be seen that there are significant areas of the domain which do not contain features requiring the higher level of refinement but which will require the computational resources of a fine grid to process. FIG. 5B illustrates the way in which a plurality of fine grids 7a, 7b and 7c can be positioned within a computational domain so as to substantially map the geometrical outline of the signal line. Intelligently positioning a fine-grid region comprising a plurality of fine grids allows a source of inhomogeneity arising in a system to be efficiently processed and resolved.

FIG. 6 illustrates, in two-dimensions, the way in which the discontinuity in the number of solution points held by two grids of different refinement levels can be dealt with. In particular, FIGS. 6A and 6B illustrate a procedure for updating the coarse-grid solution points in regions where a fine grid exists.

FIG. 6A shows two coarse-grid cells 11 and 12 of a coarse grid 10. Embedded within cell 12 is a fine grid 13 of refinement factor $[k_x \ k_y]=[3 \ 3]$. The stars 14 indicate the points on the interface which must be determined by means of spatial and temporal interpolation from value $E_{y2}$ and which form the fixed boundary conditions.

In order to obtain the coarse-grid solution $H_z$, the y-component of the gradient term, $$\left(\frac{\partial E_y}{\partial x}\right),$$

is determined, in accordance with the spatial difference approximation employed by the FDTD updating equations, by $E_{y_{x+1}} - E_{y_x}$ which can be found by $(ey_b - Ey_2)$.

FIG. 6B shows two coarse-grid cells 16 and 17 of a coarse grid 15. Embedded within cell 17 is a fine grid 18 of refinement integer $[k_x \ k_y]=[2 \ 2]$. The stars 19 indicate the points on the grid interface which must be determined by means of spatial and temporal interpolation from value $E_{y2}$ and which form the fixed boundary conditions.

In this case, in order to find the coarse-grid solution $H_z$, the y-component of the gradient term $$\left(\frac{\partial E_y}{\partial x}\right)$$

is determined in accordance with the spatial difference approximation employed by the FDTD updating equations. The E-field value required by the FDTD central differencing scheme may be obtained by spatial interpolation from values $ey_a$ and $ey_b$.

The domain in which the simulation is to be performed is normally created by means of a computer program implemented on a computer. The geometry of the system to be simulated must be specified pre-processing by a user, together with details of the initial field conditions (which may be zero), a function representing at least one source of electromagnetic radiation and the material properties (e.g. the magnetic permittivity $\in$, the magnetic permeability $\mu$, and the electric conductivity $\sigma$ may be defined). Furthermore, in order to produce an accurate solution to Maxwell's equations, the results should represent a solution over an infinite space. However, practical limitations of computer power and memory require the termination of the computational grid. Any such termination method must not affect the computations inside the finite computational grid. Thus, boundary conditions to this effect are imposed on the computational domain boundaries before the simulation is performed. Due to the explicitness of the FDTD method, Dirichlet (fixed value) interface boundary conditions are the most appropriate for the embedded fine grid boundary.

In one embodiment in which fine-grid regions, possibly of varying refinement levels, are positioned within the domain so as to map the geometrical outline of, for example, small-scale structures or curved boundaries, a user may specify the position, refinement level and boundary perimeter of each fine grid making up the fine-grid region, together with its connectivity to other fine grids within the fine-grid region.

Figure 7:
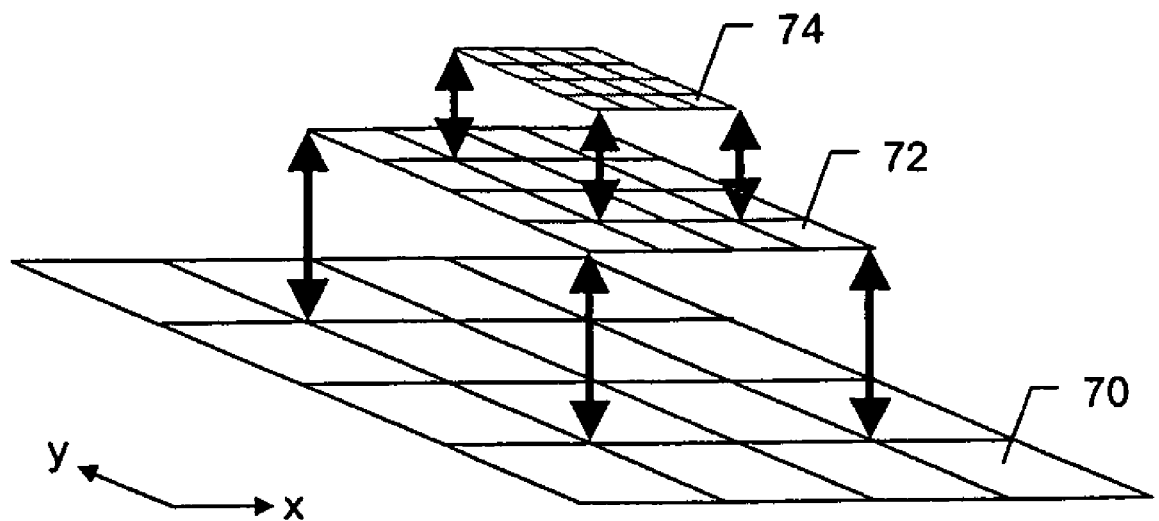
FIG. 7 shows a multi-grid domain having first, second and third grids each having uniform cells.

FIG. 7 shows a multi-grid domain having a first grid 70, a second grid 72 and a third grid 74, each having uniform cells. As can be seen, the second grid 72 is a refinement of the first grid 70 by a refinement factor $[k_x\ k_y]=[2\ 2]$, and the third grid 74 is a refinement of the second grid 72 by a refinement factor $[k_x\ k_y]=[2\ 2]$. FIG. 7 illustrates a common multigrid-FDTD grid configuration in two-dimensional space. Naturally, uniform grid refinement refines everywhere and in each dimension, even in areas where it is not necessary. This is extremely acute in three-dimensional models.

Figure 8:
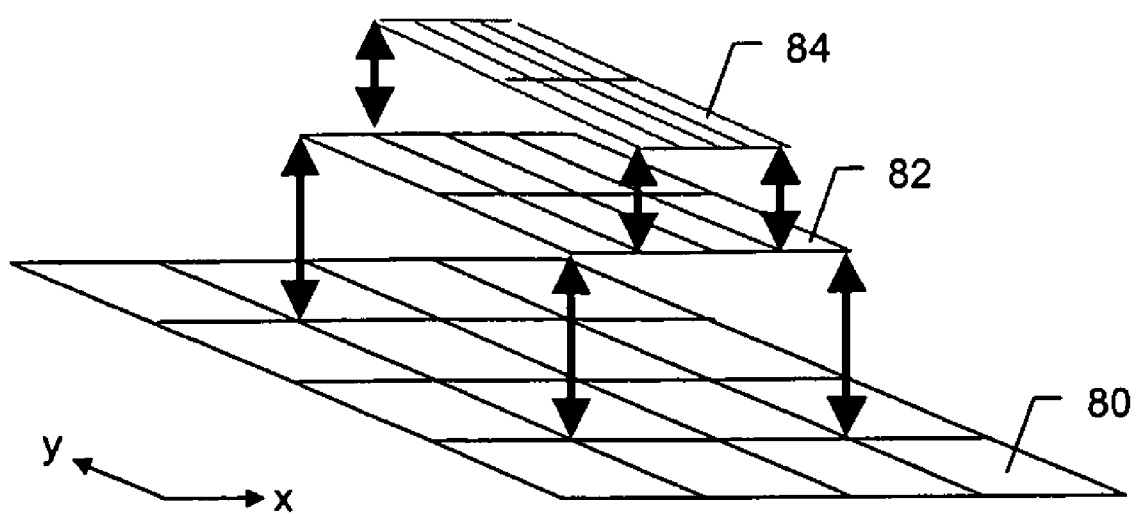
FIG. 8 shows a multi-grid domain having first, second and third grids wherein the second and third grids have non-uniform cells.

FIG. 8 shows a multi-grid domain having a first grid 80, a second grid 82 and a third grid 84, wherein the second grid 82 and the third grid 84 each have non-uniform cells. As can be seen, the second grid 82 is a refinement of the first grid 80 by a refinement factor $[k_x\ k_y\ ]=[2\ 1]$, and the third grid 84 is a refinement of the second grid 82 by a refinement factor $[k_x\ k_y\ ]=[2\ 1]$. In other words, refinement only takes place in one direction—the x dimension. It will be understood that the discussion of the update procedure and spatial and temporal interpolation given above, with reference to FIGS. 2 to 6, is equally applicable to the grids shown in FIG. 8.

Figure 9:
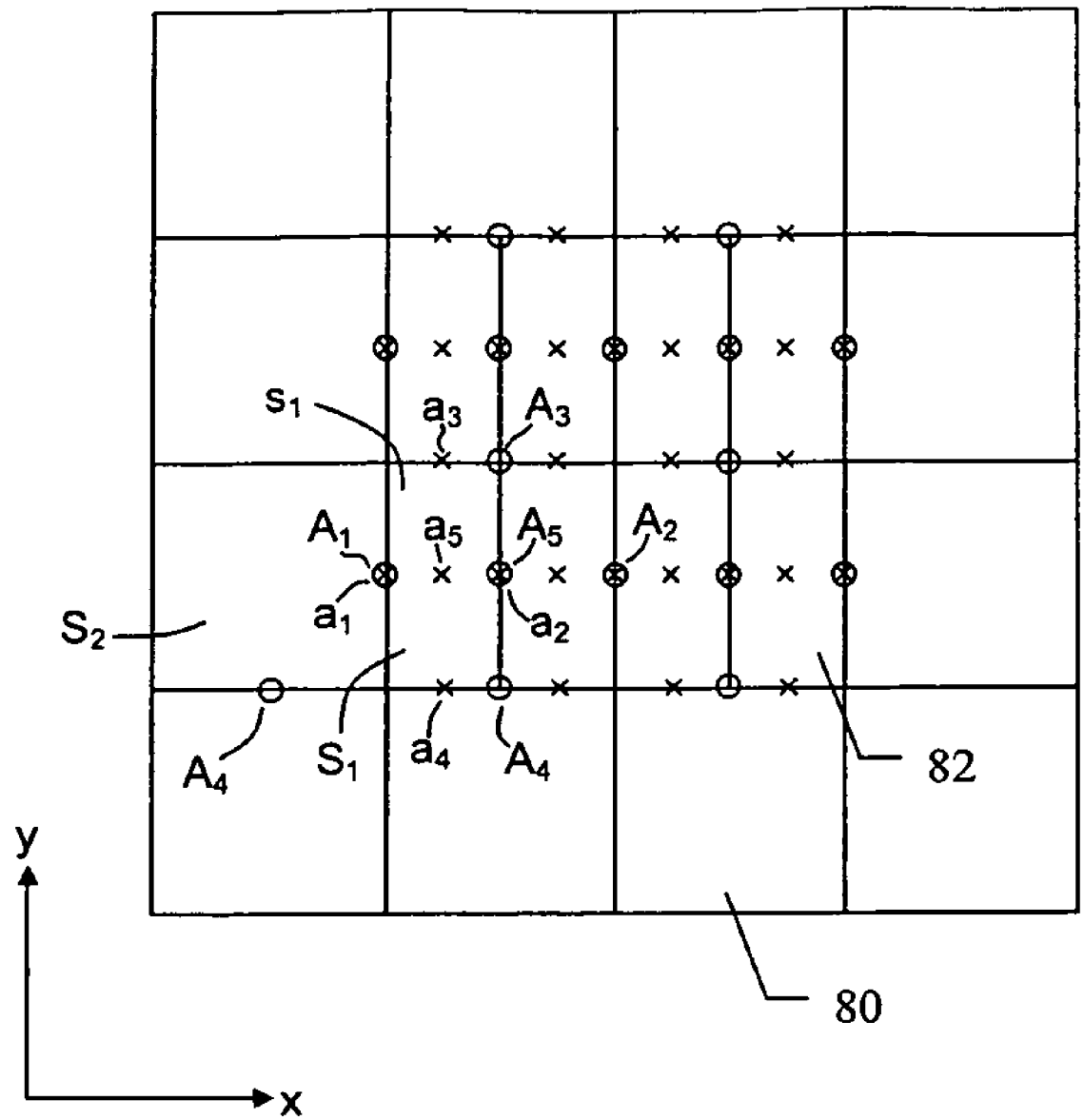
FIG. 9 shows in more detail the refinement in FIG. 8 of the first grid by the second grid.

FIG. 9 shows in more detail the refinement of the first grid 80 by the second grid 82. In particular, FIG. 9 shows cell $S_1$ of the first grid 80, which cell includes solutions points labelled $A_1$ to $A_5$ and designated by circular symbols. Also shown is cell $s_1$ of the second grid 82, which cell includes solution points labelled $a_1$ to $a_5$ and designated by cross symbols.

It will be possible for the skilled person to perform spatial and temporal interpolation between the grids 80, 82, 84 and to devise an update procedure using an approach similar to that described above.

For example, in this embodiment, the time steps for the first and second grids 80, 82 are equal, such that no temporal interpolation is required. (In another embodiment, there may be more than one time step for the second grid 82 for every time step of the first grid 80. In this case, temporal interpolation may be performed using the equation $T(A^n, A^{n+1}, j) = A^n + j(A^{n+1} - A^n)$, for example, where j is the missing temporal value of the second grid 82.) Spatial interpolation may then be performed. For example, to obtain a value for solution point $a_4$ of cell $s_1$ of the second grid 82, spatial interpolation may be performed between solution point $A_4$ of cell $S_1$ of the first grid 80 and solution point $A_4$ of cell $S_2$ of the first grid 80 using the equation $S(A_i, A_j, d) = A_i + d(A_j - A_i)$, where i and j are the x coordinates for the location of the first grid values $A_4$ of cell $S_2$ and $A_4$ of cell $S_1$ respectively, and d is the normalised distance from i to the solution point $a_4$ along the i to j path. At other parts of the domain, no spatial interpolation may be required. For example, at solution point $a_1$ of cell $s_1$ of the second grid 82, no spatial interpolation is required from solution point $A_1$ of cell $S_1$ of the first grid 80.

An update procedure may then be performed. For example, in order to find the value for $H_z$ at solution point $a_5$ of cell $s_1$ of the second grid 82, the y-component of the gradient term $$\left(\frac{\partial E_y}{\partial x}\right)$$

is determined in accordance with the spatial difference approximation employed by the FDTD updating equations. The E-field value required by the FDTD central differencing scheme may be obtained by spatial interpolation from the values for $E_y$ at solution points $a_3$ and $a_4$ of cell $s_1$.

It will be apparent that the arrangement described with reference to FIGS. 8 and 9 provides for a reduced computational load compared to a domain having one or more uniformly-refined subgrids. In a simple example, a uniform refinement of two for a coarse-grid having $N^3$ (N×N×N) cells would give a fine-grid of $8N^3$ (2N×2N×2N) cells, eight times the coarse-grid size. If the refinement is only necessary in the X-direction (for clarity only uniform refined in X) then the non-uniform refinement gives a fine-grid size of $2N^3$ (2N×N×N). This means a total grid size factor of three difference, $(N^3+8N^3)/(N^3+2N^3)$, comparing the uniform-refinement case to the non-uniform refinement case.

Table 1 shows the grid refinement process to five levels. Each level is refined by two for the whole embedded region, in the interests of clarity. At the fifth level, the total grid size difference is a factor just under six hundred. Naturally, the more levels there are, the greater the difference between the uniform and non-inform refinement cases.

TABLE 1

Uniform and non-uniform refinement to five levels

|  | Uniform | Non-uniform | Reduction Factor |
|---|---|---|---|
| Base | N × N × N | N × N × N | 1/1 = 1 |
| Level-1 | 2N × 2N × 2N | 2N × N × N | 9/3 = 3 |
| Level-2 | 4N × 4N × 4N | 4N × N × N | 73/7 = 10.4 |
| Level-3 | 8N × 8N × 8N | 8N × N × N | 585/15 = 39 |
| Level-4 | 16N × 16N × 16N | 16N × N × N | 4,681/31 = 151 |
| Level-5 | 32N × 32N × 32N | 32N × N × N | 37,449/63 = 594.4 |

The above example shows that, in a multi-level grid refinement situation, grid size reduction factors of ten to a hundred can be attained using non-uniform grid refinement. This in turn translates to computational speedup of similar magnitude. One example of the non-uniform grid refinement may be models involving signal-line type structures in which the refinement is commonly required in just one direction.

Table 2 illustrates figures that can be achieved when non-uniform refinement is applied fully to the example case. In Table 1, the x direction was uniformly refined. In Table 2, the refinement is only in areas where it is required, assuming that the average cell increase at each level is a factor of 1.5 (a refinement of two in half the x direction). At the fifth level, a total grid size reduction factor of 1800 is achieved. This kind of reduction means a substantial reduction in both memory and calculations. In other words, multi-size simulations with cell aspect scale variation of 1000 and more can be done 1000 times faster. As a result, multi-size models that had previously taken weeks to calculate can now be done in a few hours.

TABLE 2

Non-uniform refinement with an average cell increase of 1.5

|  | Uniform | Non-uniform | Reduction Factor |
|---|---|---|---|
| Base | N × N × N | $N^3$ | 1/1 = 1.0 |
| Level-1 | 2N × 2N × 2N | 1.5 $N^3$ | 9/2.5 = 3.6 |
| Level-2 | 4N × 4N × 4N | 2.25 $N^3$ | 73/4.75 = 15.37 |
| Level-3 | 8N × 8N × 8N | 3.375 $N^3$ | 585/8.125 = 72.0 |
| Level-4 | 16N × 16N × 16N | 5.0625 $N^3$ | 4,681/13.1875 = 354.96 |
| Level-5 | 32N × 32N × 32N | 7.59375 $N^3$ | 37,449/20.8 = 1,800.0 |

Furthermore, without the need to refine in all spatial directions, the size of the time-step ($\Delta t$) can be larger, according to the Courant-Friedrichs-Lewy condition for numerical stability. A larger $\Delta t$ reduces the number of time steps, which reduces the number of calculations to reach the required time period.

The Courant-Friedrichs-Lewy (CFL) condition for satisfying the time and spatial steps is:

$$\Delta t \leq \frac{1}{c\sqrt{\frac{1}{\Delta x^2} + \frac{1}{\Delta y^2} + \frac{1}{\Delta z^2}}}$$

where c is the speed of light, and t, x, y, and z are the respective time and spatial dimensions. For a cubical spatial grid ($\Delta x = \Delta y = \Delta z$), the CFL condition becomes:

TABLE 3

Time-step values for uniform and non-uniform refinement of cubical grid $$\Delta t \leq \frac{\Delta x}{c\sqrt{3}}$$

| | Uniform refinement in all directions | Non-uniform refinement in one direction |
|---|---|---|
| Refinement 2 ($\Delta x/2$) | $\Delta t \leq \frac{\Delta x}{c\sqrt{12}}$ | $\Delta t \leq \frac{\Delta x}{c\sqrt{6}}$ |
| Refinement 3 ($\Delta x/3$) | $\Delta t \leq \frac{\Delta x}{c\sqrt{27}}$ | $\Delta t \leq \frac{\Delta x}{c\sqrt{11}}$ |

Table 3 shows the time-step limits calculated from the CFL condition for a cubical spatial grid (cubical grid is for clarity only). In refinement 2, the larger $\Delta t$ limit in the non-uniform case cannot be exploited due to time synchronization between coarse and embedded fine grids—two time steps are still needed. This is not so in refinement 3, in which the non-uniform $\Delta t$ limit is larger than in the uniform case of refinement 2. This means a $\Delta t$ for two time steps is permitted, instead of three, in the embedded grid. This is a reduction of one time step (or 33% computing time) in the embedded grid for every one coarse grid time step. As the number of time steps increases, the overall computing time reduction is towards the 33% figure. This is achieved without compromising accuracy.

A multi-level grid embedding process may include both non-uniform refinement and uniform grid refinement of respective parts of a grid.

An implementation of the non-uniform grid refinement may include any one or more of the following features:—

Uniform and non-uniform grid refinement;
Calculation of the best $\Delta t$ for each of the embedded grids for the least number of time steps;
Selection of the best grid refinement strategy based on input parameters, model library database, and users' preferences;
Precise geometry representation;
Production of high quality and computationally-efficient multi-level grids;
Straightforward integration into GUI systems.

Figure 10:
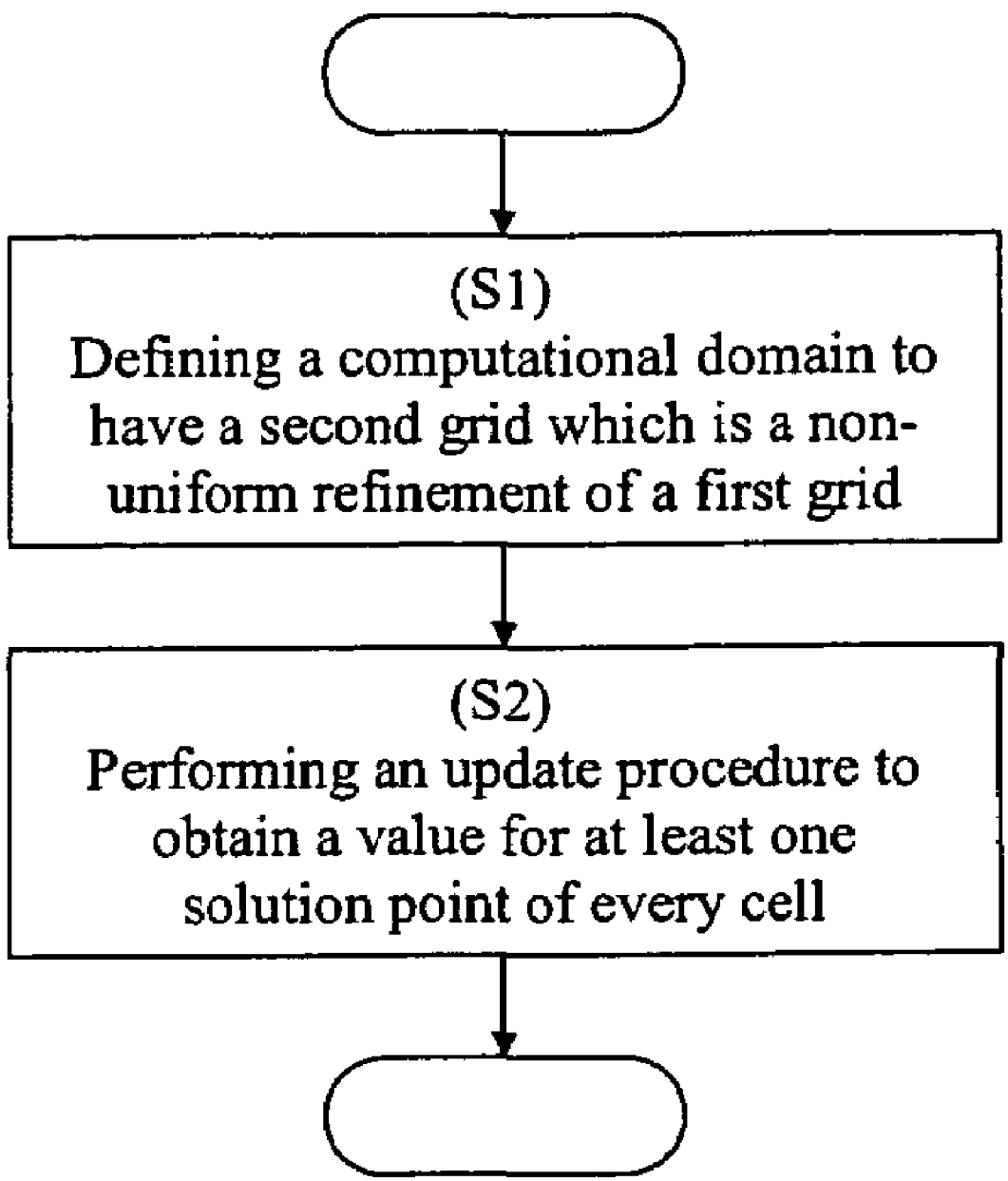
FIG. 10 is a flowchart representing a method for assessing wave propagation arising in a physical system by obtaining a numerical approximation of the physical system to be simulated.

FIG. 10 shows a method for assessing wave propagation arising in a physical system by obtaining a numerical approximation of the physical system to be simulated. The method comprises (S1) defining a computational domain comprising a first grid 80 having at least two dimensions and a plurality of first-grid cells, and a second grid 82 having at least two dimensions and a plurality of second-grid cells. The second grid 82 is a refinement of at least part of the first grid 80, and each of the first-grid cells and second-grid cells has one or more solution points at which values representing a physical quantity of the physical system to be simulated may be obtained. Defining the computational domain (S1) comprises defining the second grid 82 to have a first refinement factor compared to the first grid 80 in one of the at least two dimensions and to have a second refinement factor compared to the first grid 80 in another of the at least two dimensions, and defining the first refinement factor to be different from the second refinement factor. The method further comprises performing an update procedure (S2) to obtain a value for at least one solution point of every cell at a given stage in time.

Figure 11:
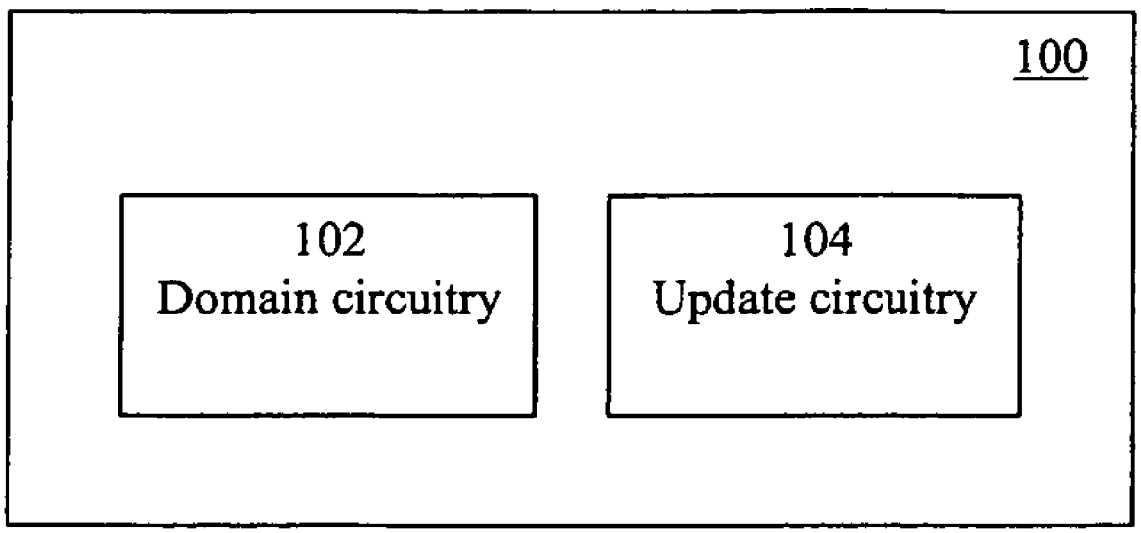
FIG. 11 is a schematic diagram of apparatus for assessing wave propagation arising in a physical system by obtaining a numerical approximation of the physical system to be simulated.

FIG. 11 shows an apparatus 100 for assessing wave propagation arising in a physical system by obtaining a numerical approximation of the physical system to be simulated. The apparatus 100 comprises domain circuitry 102 configured to define the computational domain comprising the first grid 80 and the second grid 82, and update circuitry 104 configured to perform the update procedure.

Figure 12:
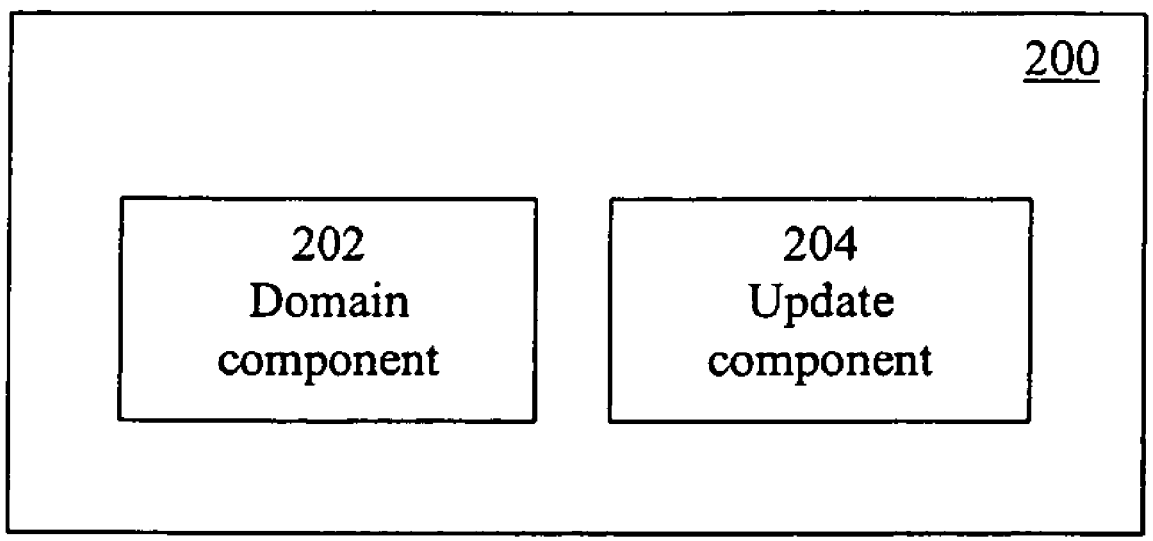
FIG. 12 is a schematic diagram of a computer program for assessing wave propagation arising in a physical system by obtaining a numerical approximation of the physical system to be simulated.

FIG. 12 shows a computer program 200 for assessing wave propagation arising in a physical system by obtaining a numerical approximation of the physical system to be simulated. The program 200 comprises a domain component 202 configured to define the computational domain comprising the first grid 80 and the second grid 82, and an update component 204 configured to perform the update procedure.

It should be appreciated that the various aspects of the present invention may be used alone or in combination in a single embodiment.

The invention claimed is:

1. A computer implemented method for assessing wave propagation arising in a physical system by obtaining a numerical approximation of the physical system to be simulated, the method comprising:

defining, using a computer, a computational domain comprising a first grid having three dimensions and a plurality of first-grid cells, and a second grid having three dimensions and a plurality of second-grid cells, wherein the second grid is a refinement of at least part of the first grid, and wherein each of the first-grid cells and second-grid cells has one or more solution points at which values representing a physical quantity of the physical system to be simulated may be obtained, wherein defining the computational domain comprises defining the second grid to have a first refinement factor compared to the first grid in one of the three dimensions and to have a second refinement factor compared to the first grid in another of the three dimensions, and to have a third refinement factor compared to the first grid in the other of the three dimensions, and defining the first refinement factor to be different from the second refinement factor and the third refinement factor to be different to at least one of the first and second refinement factors; and performing, using the computer, an update procedure to obtain a value of the physical quantity for at least one solution point of every cell at a given stage in time.

2. The method of claim 1, wherein defining the computational domain comprises defining one of the first and second refinement factors to be equal to one.

3. The method of claim 1, wherein defining the computational domain comprises defining the third refinement factor to be different to both of the first and second refinement factors.

4. The method of claim 1, wherein defining the computational domain comprises:
- defining a third grid having three dimensions and a plurality of third-grid cells, wherein the third grid is a refinement of at least part of the second grid;
- defining the third grid to have a first refinement factor compared to the second grid in one of the three dimensions;
- defining the third grid to have a second refinement factor compared to the second grid in another of the three dimensions; and
- defining the first refinement factor of the third grid to be different from the second refinement factor of the third grid.

5. An apparatus for assessing wave propagation arising in a physical system by obtaining a numerical approximation of the physical system to be simulated, the apparatus comprising:
- a computer with at least one processor and a memory storing a program of instructions;
- domain circuitry configured to define a computational domain comprising a first grid having three dimensions and a plurality of first-grid cells, and a second grid having three dimensions and a plurality of second-grid cells, wherein the second grid is a refinement of at least part of the first grid, and wherein each of the first-grid cells and second-grid cells has one or more solution points at which values representing a physical quantity of the physical system to be simulated is obtained, wherein the domain circuitry is configured to define the second grid to have a first refinement factor compared to the first grid in one of the three dimensions and to have a second refinement factor compared to the first grid in another of the three dimensions, and to have a third refinement factor compared to the first grid in the other of the three dimensions, and to define the first refinement factor to be different from the second refinement factor and the third refinement factor to be different to at least one of the first and second refinement factors; and
- update circuitry configured to perform an update procedure to obtain a value of the physical quantity for at least one solution point of every cell at a given stage in time.

6. The apparatus of claim 5, wherein the domain circuitry is configured to define one of the first and second refinement factors to be equal to one.

7. The apparatus of claim 5, wherein the domain circuitry is configured to define the third refinement factor to be different to both of the first and second refinement factors.

8. The apparatus of claim 5, wherein the domain circuitry is configured to define a third grid having at least three dimensions and a plurality of third-grid cells, wherein the third grid is a refinement of at least part of the second grid; to define the third grid to have a first refinement factor compared to the second grid in one of the three dimensions; to define the third grid to have a second refinement factor compared to the second grid in another of the three dimensions; and to define the first refinement factor of the third grid to be different from the second refinement factor of the third grid.

9. A computer readable storage medium storing computer executable instructions which, when run on a computer, causes the computer to perform the method of claim 1.

10. A computer readable storage medium storing computer executable instructions which, when loaded into a computer, causes the computer to become the apparatus of claim 5.

* * * * *

UNITED STATES PATENT AND TRADEMARK OFFICE
CERTIFICATE OF CORRECTION

PATENT NO. : 7,739,084 B2　　　　　　　　　　　　　　　　　　　　　　　　　　Page 1 of 1
APPLICATION NO. : 12/292852
DATED : June 15, 2010
INVENTOR(S) : Peter Chow It is certified that error appears in the above-identified patent and that said Letters Patent is hereby corrected as shown below:

Column 17, Line 33 delete "is obtained" and insert -- may be obtained --, therefor.

Signed and Sealed this

Sixteenth Day of November, 2010

David J. Kappos
*Director of the United States Patent and Trademark Office*